United States Patent [19]

Love et al.

[11] Patent Number: 4,914,734
[45] Date of Patent: Apr. 3, 1990

[54] INTENSITY AREA CORRELATION ADDITION TO TERRAIN RADIOMETRIC AREA CORRELATION

[75] Inventors: Robert J. Love, San Francisco; Richard I. Campbell, Saratoga, both of Calif.

[73] Assignee: The United States of America as represented by the Secretary of the Air Force, Washington, D.C.

[21] Appl. No.: 388,796

[22] Filed: Jul. 21, 1989

[51] Int. Cl.⁴ .............................................. G01S 13/86
[52] U.S. Cl. ......................................... 342/64; 342/53
[58] Field of Search ........................... 342/53, 64, 351

[56] References Cited

U.S. PATENT DOCUMENTS

| | | | |
|---|---|---|---|
| 2,705,319 | 3/1955 | Dauber | 343/7 |
| 3,054,999 | 9/1962 | Forbath et al. | 343/5 |
| 3,076,961 | 2/1963 | Bibbero | 343/6 |
| 3,306,556 | 2/1967 | Kaufman | 244/3.17 |
| 3,461,421 | 8/1969 | Stover | 340/2 |
| 3,701,158 | 10/1972 | Johnson | 343/725 |
| 3,879,728 | 4/1975 | Wolff | 342/64 |
| 3,992,707 | 11/1976 | Schmidtlein et al. | 342/64 |
| 4,106,726 | 8/1978 | Emmons et al. | 244/3.17 |
| 4,122,521 | 10/1978 | Rick et al. | 364/424 |
| 4,160,251 | 7/1979 | Lazarchik et al. | 343/100 ME |
| 4,179,693 | 12/1979 | Evans et al. | 342/64 |
| 4,277,137 | 7/1981 | Upatnieks et al. | 350/162 SF |
| 4,347,511 | 8/1982 | Hofmann et al. | 342/64 |
| 4,477,814 | 10/1984 | Brumbaugh et al. | 343/725 |
| 4,622,557 | 11/1986 | Westerfield | 342/357 |
| 4,652,885 | 3/1987 | Saffold et al. | 343/725 |
| 4,700,307 | 10/1987 | Mons et al. | 342/64 X |
| 4,780,719 | 10/1988 | Frei et al. | 342/53 |

Primary Examiner—Thomas H. Tarcza
Assistant Examiner—John B. Sotomayor
Attorney, Agent, or Firm—William G. Auton; Donald J. Singer

[57] ABSTRACT

A system which combines intensity area correlation is disclosed for use with terrain height radar and infrared emissivity systems to give a simultaneous three-mode map matching navigation system. The infrared system senses passive terrain emissions while the height finding radar measures the time between transmission of a radar signal to the ground and receipt of a radar return. The intensity correlator uses the radar returns to sense changes in the reflection coefficient of the terrain. Map matching all three modes simultaneously provides an accurate, highly jam resistant position determination for navigation update.

6 Claims, 9 Drawing Sheets

ROW MAP PERIODS

100

NOMINAL BEAM SPOT

100

REFERENCE IMAGE
UPDATE

SENSED IMAGE $H_T = H_{SL} - R \cos \theta$

TERRAIN CONTOURS

INTENSITY OF RADAR RETURN

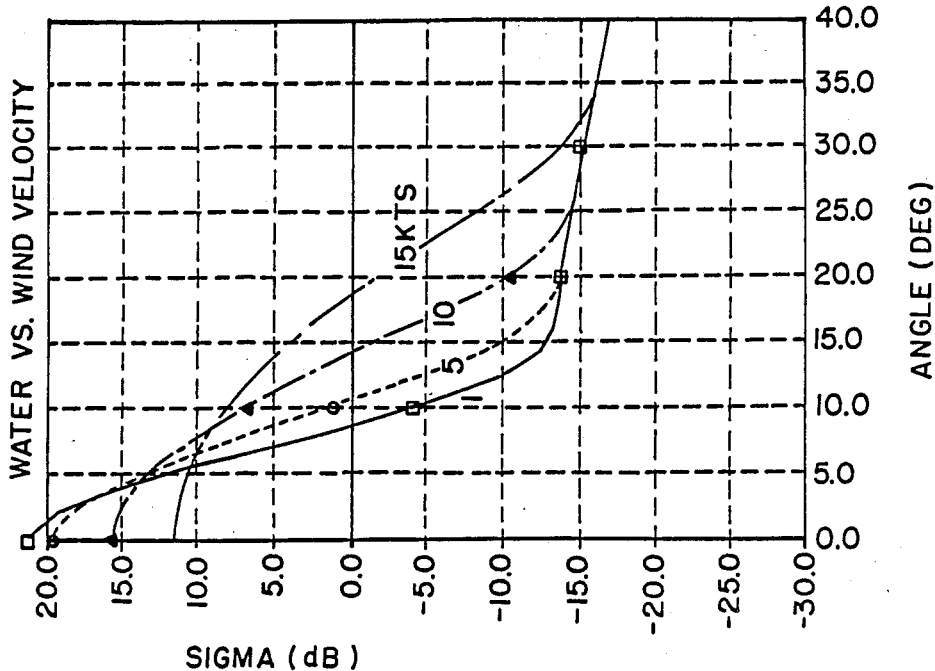
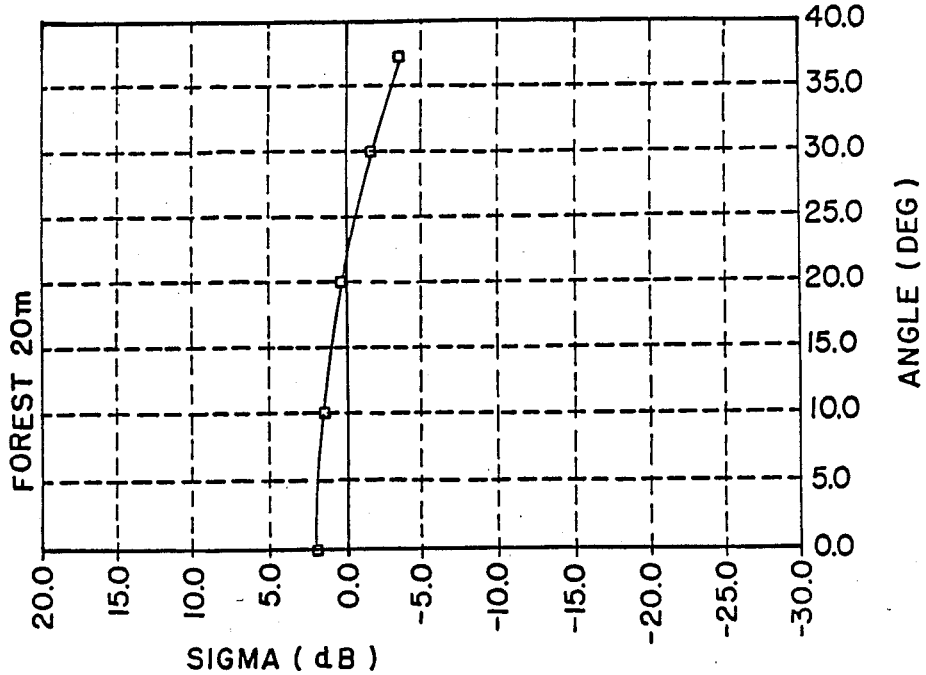

$X_V$ = $X_I$ POSITION OF VEHICLE
$X_B$ = $X_I$ POSITION OF BEAMSPOT
$\theta_{SQ}$ = SQUINT ANGLE
$\theta$ = PITCH ANGLE
$h$ = ALTITUDE ABOVE TERRAIN $\hat{R}$ = MEASURED RANGE
$R_{jI}$ = COMPONENT OF RANGE IN j DIRECTION

INTENSITY AREA CORRELATION ADDITION TO TERRAIN RADIOMETRIC AREA CORRELATION

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar mapping systems and to navigation positioning systems, and more specifically to a map-matching radar navigation system.

Many United States military aircraft and ships rely on the Global Positioning System (GPS) as a navigation system that provides a world wide navigation network through the use of a ring of satellites. Examples of GPS navigational systems are disclosed in the following references, which are incorporated herein by references:

U.S. Pat. No. 3,461,421 issued to H. Stover on 12 Aug. 1968;

U.S. patent application Ser. No. 666,784 filed on 31 Oct. 1984 by Edwin Westerfield; and U.S. patent application Ser. No. 377,214 filed on 11 May 1982 by Richard Lane.

The Stover reference discloses a sonobuoy system which has direction finding and range capabilities. The Westerfield and Lane references described the use of a Global Positioning System to determine the geodetic location of a single sonobuoy in an array of sonobuoys and, in turn the determination of the splash point reentry vehicles.

While the GPS navigation system is admirable in may respects, it is subject to jamming by electromagnetic interference. For this reason, there exists the need for an independent navigation system that is capable of providing accurate position updates to airborne platforms. In use, this independent system can serve as a backup to existing navigational systems, or in the alternative is capable of acting as the primary navigation system for aircraft.

The task of providing an airborne radar map-matching navigation system is alleviated to some extent, by the system disclosed in the following U.S. Patents, the disclosures of which are incorporated by reference:

U.S. Pat. No. 2,705,319 issued to Dauber;
U.S. Pat. No. 3,054,999 issued to Forbath et al;
U.S. Pat. No. 3,605,556 issued to Kaufman;
U.S. Pat. No. 4,106,726 issued to Emmons et al;
U.S. Pat. No. 4,277,137 issued to Upatnieks et al;
U.S. Pat. No. 3,076,961 issued to Bibbero;
U.S. Pat. No. 3,701,158 issued to Johnson;
U.S. Pat. No. 4,122,421 issued to Rick et al;
U.S. Pat. No. 4,160,251 issued to Lazarchik et al; and
U.S. Pat. No. 4,447,814 issued to Brumbaugh et al Dauber discloses an airborne system for the detection of changes in terrain reflection coefficient. The patented system uses changes in the reflection of radio waves to detect and fix the location of camouflaged military installations.

Emmons et al discuss a prestored area correlation tracker which relies on multiple digital representations of a target scene. Suitable optical sensors associated with the patented tracker serve to detect changes in tracker spatial orientation, which in turn are used by a missile autopilot to properly steer the missile to the target.

A correlation evaluator for a map matching navigation system is disclosed in Forbath et al. Upatnieks et al are concerned with a terminal guidance system using coherent optical correlation. Kaufman discloses a system for homing a missile on target which distinguishes a change in light intensity in the area immediately surrounding the target.

Lazarchil et al disclose a radiometric system for target recognition which operates in both active and passive modes. In column 3, beginning line 36, this patent states "In the active mode of the hybrid radiometer, the return signal measurement is based upon the backscattering properties of the terrain." The patented system is described as providing discrimination against jamming and spurious signals. Bibbero shows a coordinated three-mode system for aerial reconnaissance which combines infrared, TV and radar coverages. Johnson provides a directional antenna for sensing both radio waves reflected from a target and infrared rays emanating from the target. A dual mode radio frequency-infrared frequency energy seeker system is disclosed in Brumbaugh et al.

Rick et al relate to a multiple sensor system for airborne reconnaissance. The sensors of this patent may be cameras, magnetic recording devices, radar sets, or other type of detector capable of simultaneous operation in the same system.

While the above-cited references are instructive, a need remains to provide an airborne radar map-matching navigation system. The present invention is intended to satisfy that need.

SUMMARY OF THE INVENTION

The present invention combines intensity area correlation with terrain height radar and infrared emissivity systems to give a simultaneous three-mode map matching navigation system. The infrared system senses passive terrain emissions while the height finding radar measures the time between transmission of a radar signal to the ground and receipt of a radar return. The intensity correlator uses the radar returns to sense changes in the reflection coefficient of the terrain. Map matching all three modes simultaneously provides an accurate, highly jam resistant position determination for navigation update.

The subject matter of this application is related to the subject matter contained in the following U.S. patent application Ser. No. 07/388791; filed 7/21/89, entitled "INTENSITY AREA CORRECTION" by R. J. Love et al, the disclosure of which is incorporated herein by reference. This reference discloses a means for correlating detected terrain echo returns, which form a sensed map, with a stored reference map to locate the position of an aircraft on a reference map. In one embodiment of the present invention, a complete map-matching navigation system relies on the correlation system of the above cited Love reference to provide jam-resistant position updates to an aircraft.

It is an object of the present invention to provide aircraft with an independent form of navigation that is not dependent upon external sources of information.

It is another object of the present invention to provide a map-matching radar navigation system to aircraft.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIGS. 9–13 are charts depicting different intensities of expected radar return signals from different types of terrain;

DETAILED DESCRIPTION OF THE PREFERRED EMBODIMENT

The present invention is a map-matching aircraft navigation system, which provides navigational updates to an aircraft by correlating a set of sensed terrain reference signals (called a "sensed map") with a stored reference map.

One embodiment of the present invention is capable of using multiple sensor systems, including the Lockhead Multimode System known as TRIAC (Terrain Radiometric Intensity Area Correlation). The TRIAC system is a tri-mode sensing system which operates at millimeter wave frequency in one of three sensing modes: (1) Terrain Area Correlation (TAC) which uses a radar altimeter to form a terrain elevation contour image, (2) Radiometric area correlation (RAC) which uses a radiometer to measure thermal emitted and reflected energy to form a radiometric image, and (3) Intensity Area Correlation (IAC) which uses a radar to measure reflected radar energy to form an intensity image.

The sensors in this embodiment include: an infrared detection system, a height finding terrain radar system, and a terrain characterization radar system. The infrared detector system senses passive terrain emissions, and forms an infrared characteristic sensed map. The height finding terrain radar system forms a terrain elevation contour sensed map. The terrain characterization radar system is used to characterize the nature of the terrain (water, snow, building, fields, and forest) by the intensity of the terrain echo return signals.

Collectively, the terrain radar systems and the infrared systems may be used in a three-mode map matching navigation system. As discussed in the Love reference, the system will correlate each of the sensed maps with a stored referenced map to locate the sensed maps on their corresponding reference map. Since the aircraft's position with respect to the sensed maps is known, and since the reference map has a corresponding longitude and latitude, the system may provide a navigational update as to the aircraft's position.

Before proceeding to the details of the invention, it is important to note that any single one of the three sensors can be used with the intensity area correlation process of the Love reference to provide navigational position updates to the aircraft. However, map matching in all three modes will provide enhanced scene availability and increased reliability since each system may act as a back-up for the other systems.

Figure 1:
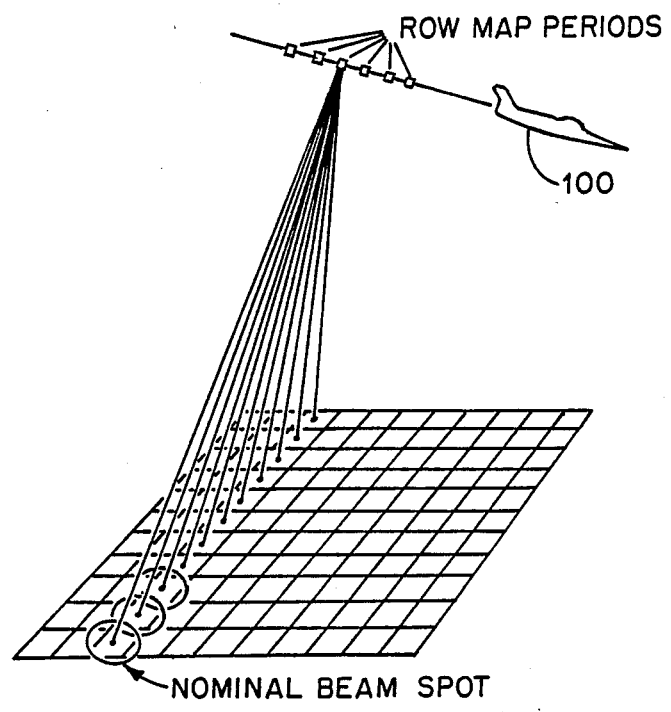
FIG. 1 is an illustration of an aircraft using a map-matching radar system to obtain a sensed map of the terrain it traverses.
Figure 2:
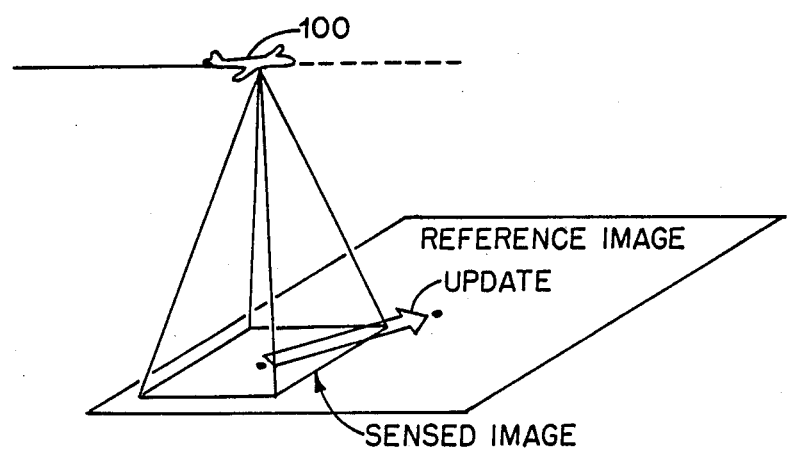
FIG. 2 is an illustration of the concept of positioning a sensed map onto a stored reference map in accordance with the present invention.

The reader's direction is now directed towards FIG. 1 which is an illustration of an aircraft using the mapping radar system to obtain a sensed map of the terrain it traverses. The process of the present invention relies on changes in the reflections of a radar signal from ground terrain materials such as forest, soil, river, metal or concrete. A map is formed by the changes in reflectivity coefficient of these materials. The radar beam is controlled in the crosstrack direction by a scanning antenna and in the downtrack direction by aircraft motion. It results in highly accurate and jam resistant position updates for airborne platforms when the sensed map is correlated with the reference map stored in the memory as shown in FIG. 2.

As shown in FIG. 1, the antenna steers a pencil beam in a pattern of rows and columns to obtain a raster scan of the terrain. The view angles of the radar ranges between 0 and 30 degrees on either side of the aircraft while looking directly beneath the aircraft. The terrain echo returns indicate the features of the land as described below.

Buildings, towers, and other man-made structures give more intense echo signals than ordinary countryside because of the presence of flat reflecting surfaces and "corner reflectors." Bodies of water, roads, and airport runways backscatter little energy but are recognizable on radar displays since they appear as black areas amid the brightness of the surrounding ground echoes. A hill will appear to stand out in high relief since the near side will give a large return, while the far side, which is relatively hidden from the view of the radar, will give a small return.

Once the terrain echo return signals are received by the radar receiver, the sensed map is compared with a reference map which is stored in the system memory. As mentioned above, the reference map is a two dimensional raster that predicts the sensor response. The parameter used in the reference map is the reflectivity coefficient, of materials. These materials may be natural: forest, soil, river or manmade: metal, concrete.

The sensed map is compared with the reference map by the correlator usign a correlation algorithm. In one embodiment of the invention, the algorithm used is the minimum variance algorithm which is described in the above-cited Love reference.

Note that for all three sensors, both the sensed maps and the reference maps are each represented in the form of a square matrix of numbers representing the passive radiometric properties of the materials in the scene. The use of the minimum variance (MV) correlation algorithm permits maps to be encoded in a variety of ways. For example, certain regions can be encoded with unique numbers starting with unity for the background. A "region" is defined as a contiguous area on the ground which is expected to have a relatively homogeneous reflectivity of emissivity that differs from that of its surroundings. Similarly, in another coding scheme, regions corresponding to the same material are assigned the same code.

Figure 3:
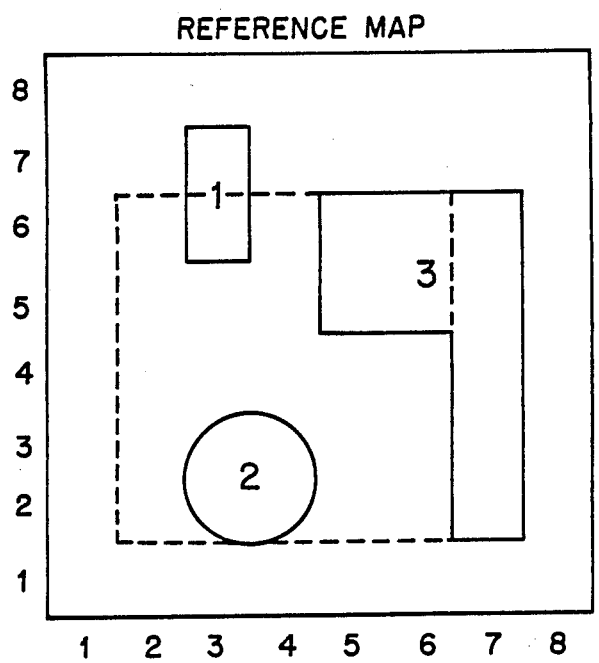
FIG. 3 is an illustration of an example of a reference map.

FIG. 3 is intended to represent an example of a reference map which has three geometric shapes 1–3 distinguished from a background 4. The numbers 1–4 in the reference map are also intended to represent normalized terrain echo return valves which are represented on a scale of 1 to 10. As mentioned above, the invention may be used with sensors which identify terrain characteristics by either height, temperature, or magnitude of the radar reflection. In FIG. 3, a simple example, if the scale is a measure of terrain height in kilometers then the rectangle 1 has a height of 1 kilometer, the circle 2 has a height of 2 kilometers, and the L-shaped block 3 has a height of 3 kilometers with a background 4, which has a height of 4 kilometers.

The algorithm is invariant to signature bias, scale, and contrast reversal. This approach to correlation makes it unnecessary in preparing a synthetic reference map to identify a material type in each area or to predict a sensor return. It permits the Analyst/Interpreter to disregard all but distinct homogeneous areas in preparing the synthetic reference map. This approach assumes only that the variability of sensor return is small for pixels within the homogeneous region compared with the sensor variability from region to region.

The units in FIG. 3 can also represent normalized terrain temperature readings. If this is the case, the term $$\sum_m f_m (S_m - S)^2$$

is summing temperature changes between the regions. The denominator, $$\sum_m f_m \gamma_m$$

is summing the variation of temperature within regions. Intuitively, we would like the $\Delta$ t i.e. between feature variation, to be high and within feature variation to be low to determine the appropriate match point. For example, if each region is perfectly homogeneous ($\gamma_m = 0$ for all m) and some degree of contrast exists between at least two regions, then K (Eq. 3) is infinite and $\phi_{mv}^2 = 1$. A zero value of $\phi_{mv}^2$ is obtained, on the other hand, if the average temperature of each region is the same ($\bar{S}_m = S$ for all m).

Figure 4:
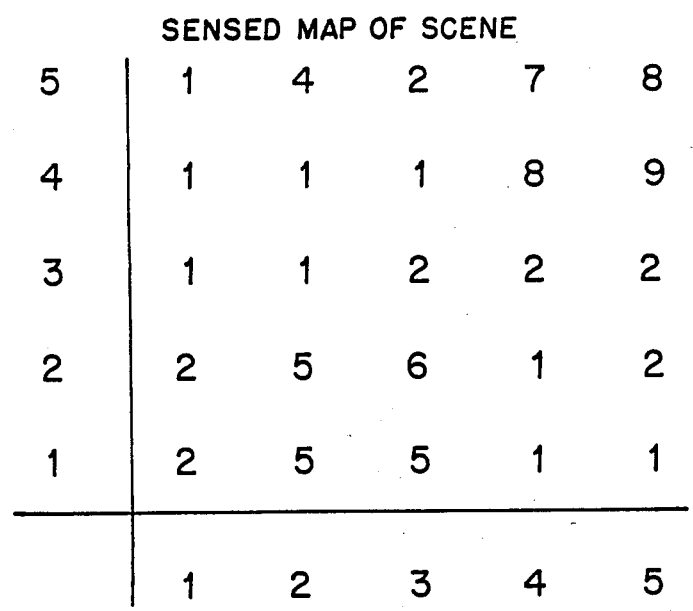
FIG. 4 is an illustration of a matrix example of a sensed map which is intended to be positioned onto the reference map of FIG. 3.

FIG. 4 is intended to serve as an example of a sensed map which will be located on the reference map of FIG. 3. FIG. 4 is actually an array of twenty-five sensed regions arranged in five rows (horizontal) and five columns (vertical) of readings in the manner shown in FIG. 3. FIG. 1 illustrates an aircraft obtaining a sensed map in the form of an array of multiple rows of multiple columns of terrain ground echo returns. In FIG. 4, examples of normalized values of the sensed data (on a scale of 1–10) are depicted. The discussion that follows will show how the correlation algorithm will locate the sensed map of FIG. 4 on the stored map of FIG. 3.

In the above-cited Love reference, the sensed map is compared with the reference map by the correlator using a correlation algorithm. In one embodiment of the invention, the algoritm used is the minimum variance algorithm which is described below.

The minnimum variance (MV) correlation function, $\phi^2$ MV, is defined as:

$$\phi_{MV}^2(i,j) = \frac{K(i,j)}{1 + K(i,j)} \quad (1)$$

where K(i,j) is the scene signal-to-noise ratio given by:

$$K(i,j) = \sum_m \frac{N_m(i,j) [s_m(i,j) - s]^2}{\sum_m [N_m(i,j) \gamma_m(i,j)]} \quad (2)$$

and $$S = \frac{1}{N_S} \sum_{k,l} S(k,l) \quad (3)$$

$$S_m(i,j) = \frac{1}{N_m(i,j)} \sum_{k,l \in m} S(k,l) \quad (4)$$

$$\gamma_m(i,j) = \frac{1}{N_m(i,j)} \sum_{k,l \in m} S^2(k,l) - [S_m(i,j)]^2 \quad (5)$$

The constituent parameters are defined as follows:
$\phi_{mv}^2(i,j)$ = Correlation Array
K = Scene SNR
$\bar{S}$ = Sensed Data Average
m = Region Index Corresponding to Distinct RM Regions
$f_m$ = Fraction of SM Corresponding to Region m in RM
$\gamma_m$ = Variance of SM Corresponding to Region m in RM
$\bar{S}_m$ = Sensed Data Average Corresponding to Region m in RM
$n_m$ = Number of Pixels in SM Corresponding to Region m of RM $$\sum_{kl \in m} =$$

Summation over indices k, l which lie within region m of RM The index m ranges over all region indices in the referenced map and the indices i, j range over all permissible offsets of the reference map with the sensed map.

i.e. $0 \leq i, j \leq N_R - N_S$

The symbol $\phi_{mv}^2$ defines the correlation function which has a range of values:

$$0 \leq \phi_{mv}^2 \leq 1$$

The quantities $\phi_{mv}^2$, K, $f_m$, $n_m$, e,ovs/S/$_m$, and $\gamma_m$ are all functions of the indices i, j.

We begin correlation by aligning Row 1, Column 1 in the reference map (RM) with Row 1, Column 1 in the sensed map (SM) and computing $\phi_{mv}^2$. We then offset the SM to place Row 1, Column 1 in the SM to Row 1, Column 2 of the RM, etc.

A typical calculation for a (2,2) offset (see FIG. 3) is as follows:

$$K = \left[ \frac{1}{25}(4 - 3.2)^2 + \frac{4}{25}(5.25 - 3.2)^2 + \right.$$

$$\left. \frac{4}{25}(8 - 3.2)^2 + \frac{16}{25}(1.4375 - 3.2)^2 \right]$$

$$f_1 \ S_1 \ S \ f_2 \ S_2 \ S \ f_3 \ S_3 \ S \ f_4 \ S_4 \ S$$

$$\left[ \frac{1}{25}(0) + \frac{4}{25}(.1875) + \frac{4}{25}(.5) + \right.$$

$$\left. \frac{16}{25}(.2461) \right] = 23.82243 = K$$

$$f_1 \ \gamma_1 \ f_2 \ \gamma_2 \ f_3 \ \gamma_3 \ f_4 \ \gamma_4 \ \phi^2_{mv}(2,2) = \frac{K}{1+K} = 0.95971$$

Recall again the $f_m$=fraction of SM in region m, $\bar{S}_m$=average of sensed data in region m, $\bar{S}$=average of sensed data, $_m$=variance of sensed data in region m.

The correlation matrix is as follows:

$$\phi^2_{mv}(i,j) = \begin{array}{c|cccc} 4 & .06182 & .14196 & .13748 & .02314 \\ 3 & .09924 & .18453 & .06354 & .10053 \\ 2 & .37801 & .95971 & .17226 & .02711 \\ 1 & .14639 & .25539 & .15852 & .05865 \\ \hline & 1 & 2 & 3 & 4 \end{array}$$

We now search the correlation array for the maximum value which in our example is at the (2,2) position indicating an accurate match point for this case.

This correlation matrix shows that the array of data of the sensed map of FIG. 4 has a maximum correlation with the reference map of FIG. 3 when it is offset i (i,j) at values of (2,2). Returning to FIG. 3, the dotted region on FIG. 3 indicates the positioning of the sensed map of FIG. 4 as the (1,1) corner of FIG. 4 is offset by (2,2) on FIG. 3.

FIGS. 1-4 are intended to serve as an overview of map-matching navigation systems, and the correlation process of the above-cited Love reference. As mentioned above, the present invention is a multi-mode map-matching navigation system which, in one embodiment, uses three sensor systems to acquire sensed maps. Each of these sensor systems are described in detail below. These include: the TAC, which acquires a radar terrain contour image; RAC, which acquires a radiometric temperature image of terrain, and IAC, which acquires a radar signal intensity image of terrain.

Figure 5:
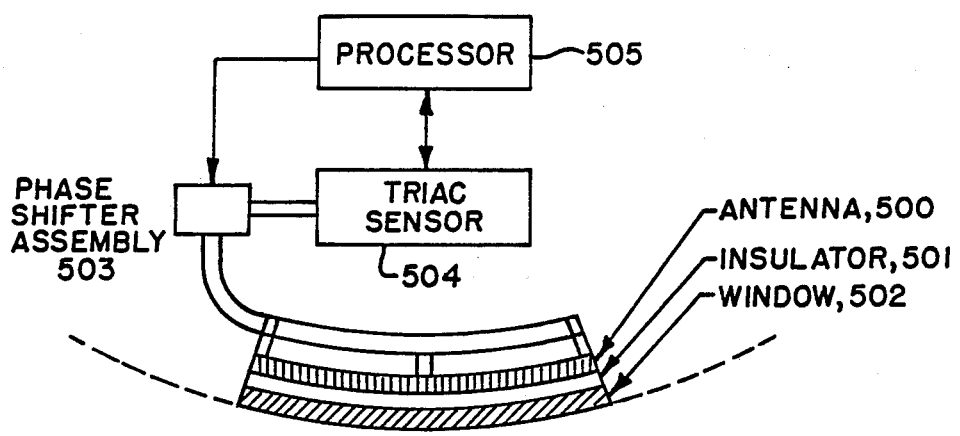
FIG. 5 is an illustration of the components that can be used in the presence invention.

The reader's attention is now directed towards FIG. 5, which is a schematic of a sensor system suitable for use in the TAC, IAC, and RAC modes. The system of FIG. 5 is an airborne phased array radar system which acquires a radar contour image using: a phased array antenna 500, an insulator 501, a radome window 502, a phase shifter assembly 503, and a central radar processor 505. All of the elements in FIG. 5 are conventional, and are presently used in such systems as the airborne phased array telemetry system (APATS).

In the system of FIG. 5, the processor 505 uses the phase shifter assembly to electronically steer the terrain-sensing beam into a pencil beam in a pattern of rows and columns to obtain a raster scan of the terrain. The view angles of the radar ranges between 0 and 30 degrees on either side of the aircraft while looking directly beneath the aircraft. The terrain echo returns indicate the features of the land.

Terrain echo return signals, in the form of acquired sensed data, are received by the central TRIAC sensor 504, and forwarded to the processor 505, which performs the correlation of the sensed map with the stored reference map to provide an identification of the aircraft position in the manner discussed in the above-cited Love reference.

As mentioned above, the system of FIG. 5 is a sensor system which is suitable for use for either: the terrain area correlation system (which acquires radar terrain contour data); the intensity area correlation system (which categorizes terrain by signal intensity of echo return signals); or the radiometric area correlation system (which acquires radiometric temperature data on the terrain). Note that the RAC process senses natural radiation of the terrain, and does not necessarily use a transmitter. For this reason, Table 1 is presented below to identify the components of the equipment in FIG. 5 that are used in: TAC, RAC, and IAC. Also note that the antenna used in RAC is a commercially-available radiometer.

TABLE 1

| SYSTEM ELEMENT | TAC | MODE RAC | IAC |
|---|---|---|---|
| WINDOW | X | X | X |
| ANTENNA | X | X | X |
| TRANSMITTER | X |  | X |
| SENSOR RF SECTION | X |  | X |
| SENSOR PROCESSOR | X | X | X |
| RADIOMETER |  | X |  |

Note that there exists some alternatives in the art that may be used as the radar terrain mapping system of FIG. 5. The above-cited Dauber reference discloses a radar mapping system. Additionally, the map-matching radar navigation system of the above-cited Forbath et al reference can serve to acquire the sensed map. It is believed that airborne phased array systems are sufficiently understood such that no additional information is needed to enable one skilled in the art to find a suitable terrain area correlation radar system for use with the present invention. For further details on phased array systems in general, the reader is directed to the text by Merrill I. Skolnik entitled "Introduction to Radar Systems" the disclosure of which is specifically incorporated by reference.

Figure 6:
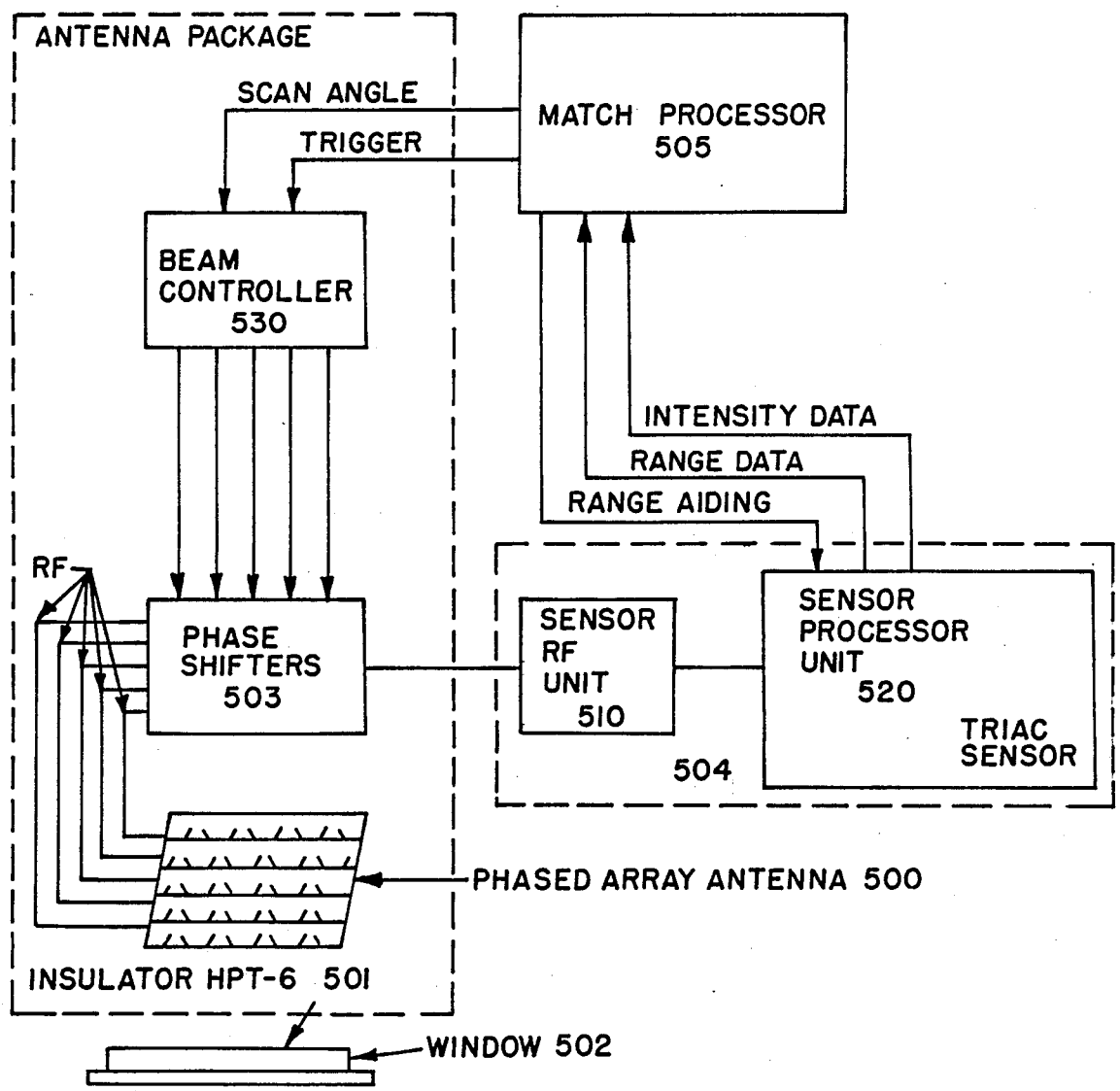
FIG. 6 is a more detailed illustration of the system of FIG. 5.

FIG. 6 is a more detailed block diagram of the system of FIG. 5, and is intended to illustrate that conventional radar units are used in the TAC sensor system to acquire terrain contour information. For example, the TRIAC sensor 504 of FIG. 5 includes the sensor RF unit 510, and a sensor processor 520. The sensor RF unit 510 is a conventional radar receiver which receives, amplifies and converts into digital format the radio frequency signals received by the antenna 500. The sensor processor unit 520 compiles radar data into the sensed maps, and forwards them to the match processor 505 for correlation in the manner described in the Love reference.

The beam controller 530 is a conventional beam steering unit which directs the phase shifters 503 to electronically steer the transmitted radar beam in accordance with the commands of the system processor 505.

Figure 7:
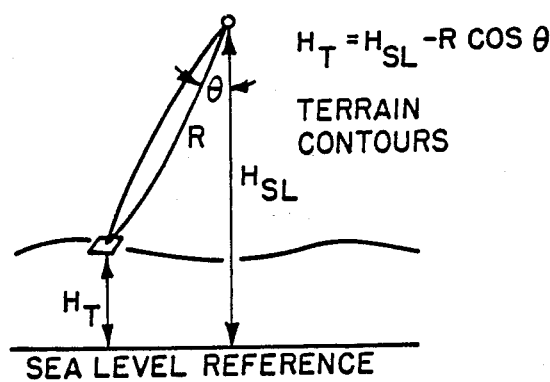
FIG. 7 is an illustration of the radar mapping strategy used in terrain area correlation.

If the system of FIGS. 5 and 6 is applied as a TAC sensor system, then the radar system is used to acquire a radar contour image. FIG. 7 is an illustration of the radar mapping strategy which is normally used to define a terrain signature by terrain contours. The radar range R is easily determined by measuring the amount of time it takes to receive a terrain echo return signal once the radar RF signal is transmitted. The aircraft instrumentation provides $H_{SL}$, which is the height of the aircraft above sea level therefore the height of the terrain is given by the following equation.

$H_T = H_{SL} - R \cos \theta$ where

R = the range of the terrain;
$\theta$ = the beam pointing angle with respect to a vertical vector;
$H_{SL}$ is the height of the aircraft above sea level; and
$H_T$ is the height of the terrain.

Figure 8:
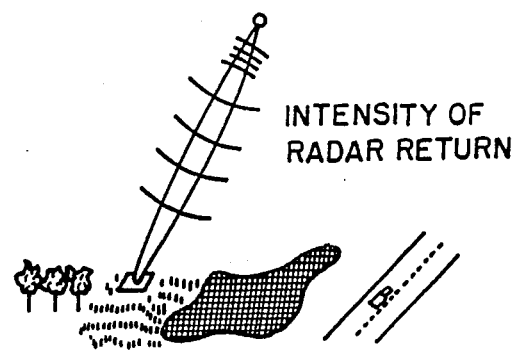
FIG. 8 is an illustration of the radar mapping strategy in intensity area correlation.

When the system of FIGS. 5 and 6 is applied as a IAC sensor system, then it acquires a radar signal intensity image of the terrain. In this use, as shown in FIG. 8, the radar system will identify the nature of the terrain (water, fields, buildings, trees, etc.) in accordance with the intensity of the terrain echo return signal.

Buildings, towers, and other man-made structures give more intense echo signals than oridnary countryside because of the presence of flat reflecting surfaces and "corner reflectors." Bodies of water, roads, and airport runways backscatter little energy but are recognizable on radar displays since they appear as black areas amid the brightness of the surrounding ground echoes. A hill will appear to stand out in high relief since the near side will give a large return, while the far side, which is relatively hidden from the view of the radar, will give a small return.

In describing the echo signal from extended echo returns from the ground or the sea, the cross section per unit of intercepted area $\sigma^0$ is taken as a measure of echo strength instead of the more usual cross section $\sigma$ of a target. With an extended target such as clutter, $\sigma$ is a function of the size of the antenna beam illuminating the ground or the sea; however, $\sigma^0$ is more or less independent of the size of the clutter patch illuminated. In some instances, the parameter $\gamma = \sigma^0/\sin \phi$ has been used as a measure of echo-signal return, where $\phi$ is the angle of depression of the antenna beam as measured from the horizontal. For rough terrain, is approximately independent of the angle $\phi$, except near grazing or near perpendicular incidence.

If the pulse width is $\tau$ and if c is the velocity of propagation, all the individual scatterers located within the distance $c\tau/2$ along the line of propagation contribute to the composite clutter echo. The factor $\frac{1}{2}$ is a consequence of the two-way radar transit time. From FIG. 3, it is seen that $\sigma^0$ is equal to $\sigma/[(c\tau/2)R\theta_\beta \sec \phi]$, where $\sigma$ is the total cross section of all the individual scatterers located within the area of the antenna beam projected on the earth's surface, "R" is the range, and $\theta_\beta$ is the half-power beam-width in the azimuth plane.

Figure 9:
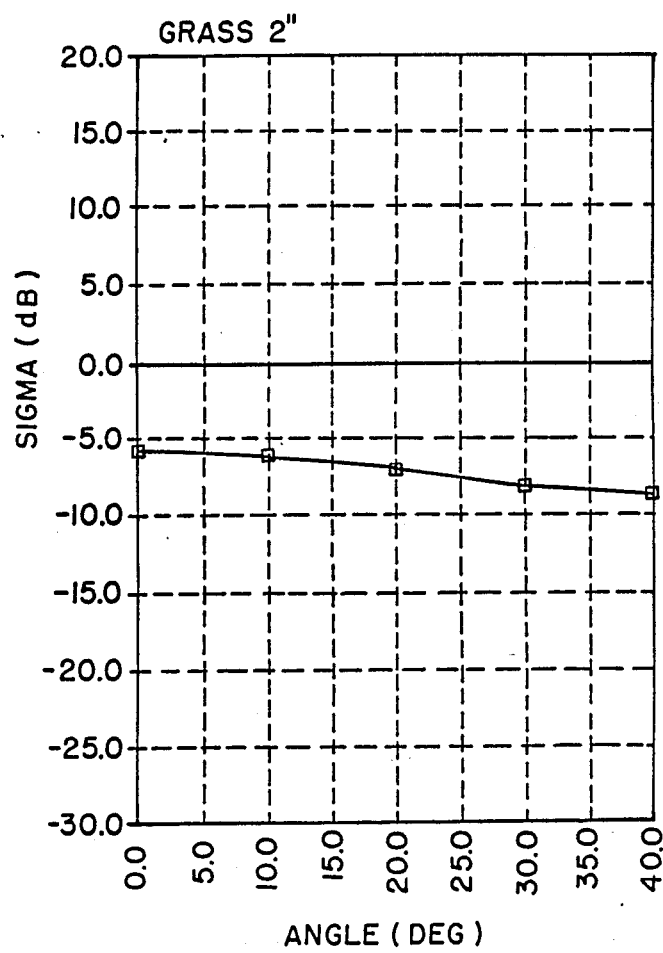
Figure 13:
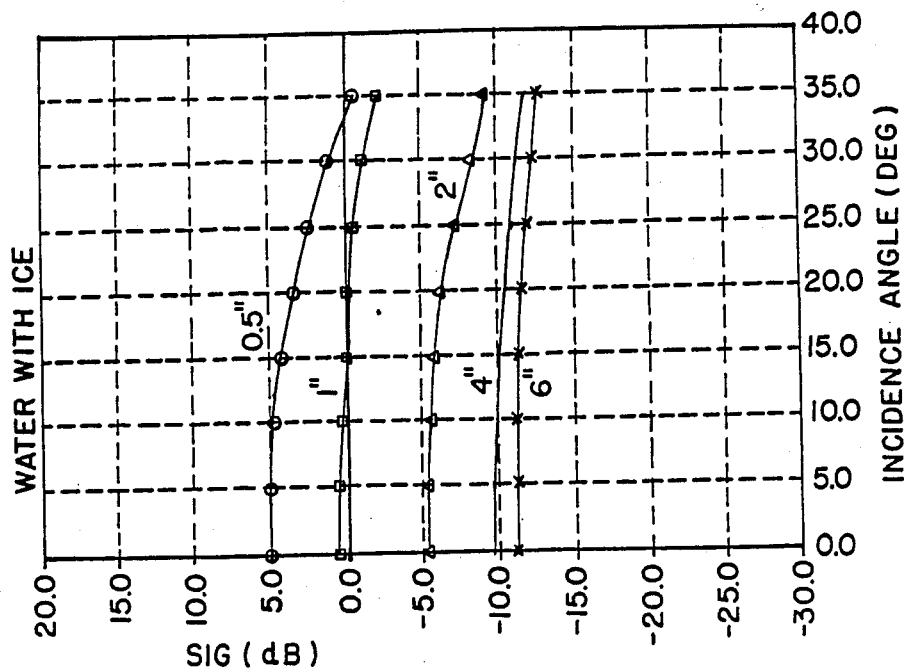
Figure 12:
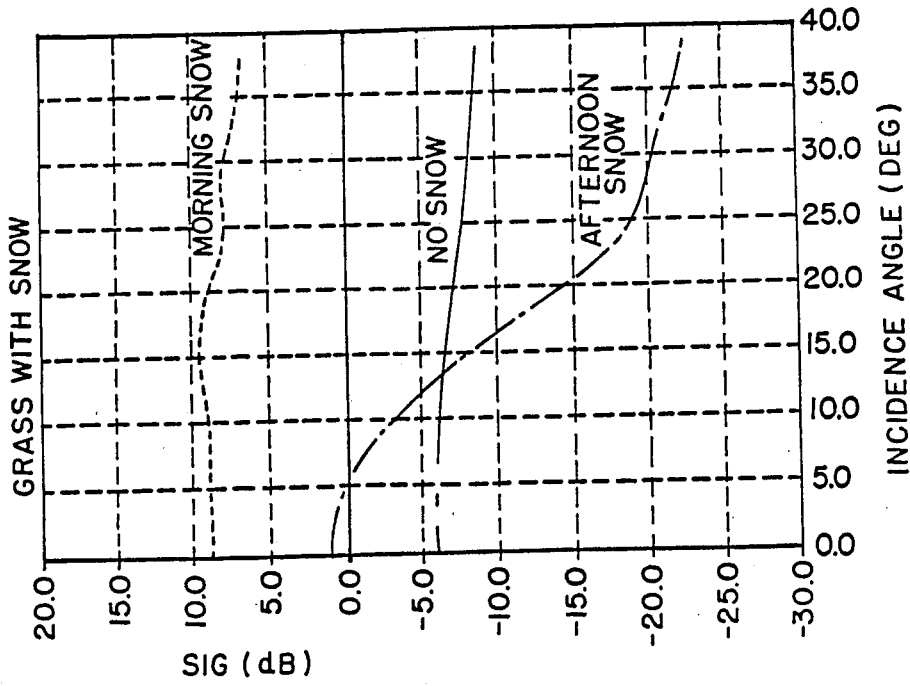

FIGS. 9–13 are charts depicting terrain echo return signals expected during map acquisition as illustrated in FIG. 3. In each of these charts the vertical axis is the measure of echo strength (in dB) which the horizontal axis depicts the view angle of the radar with respect to an axis normal with the antenna. FIG. 9 is a chart for a field covered with two inches of grass. FIG. 10 is a chart of expected returns when the terrain is a forest. FIG. 11 depicts the expected echoes from a body of water for different wind velocities. FIG. 12 depicts the expected returns from a field covered with two inches of grass and two feet of snow. FIG. 13 is a chart depicting the expected echo returns from water covered with ice.

As indicated above, the nature of the terrain echo return signals provides an identification of the nature of the terrain. As a general rule, buildings and towers provide the most intense echo signals and are easily identified on the sensed map. Similarly, bodies of water and roads are easily recognizable since they provide the weakest echo return signals. Mountains and hills provide strong echo return signals, while fields and forests provide medium strength radar echo return signals. Therefore, when the sensed map is acquired, it provides an identify of the terrain nature by the characteristics of the radar echo return signals.

Figure 14:
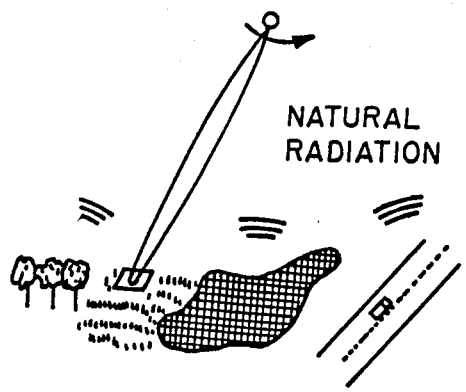
FIG. 14 is an illustration of an airborne sensor system acquiring a terrain signature by the natural radiation it emits.

If the system of FIGS. 5 and 6 is applied as the RAC sensor system, then the antenna system is used to acquire a radiometric temperature image of the terrain. FIG. 14 is an illustration of an airborne sensor system which acquires a terrain signature from the natural radiation it emits. The RAC sensor system is a passive sensor, and obtains a radiometric temperature image of the terrain without transmitting signals. In other words, the RAC sensor system uses the antenna 500 and sensors 504 only to receive the natural radiation of landscapes in order to characterize the terrain by radiometric temperature.

Examples of multi-sensor systems that include infrared sensor systems are found in the above-cited Bibbero, Johnson, and Brumbaugh references. Bibbero is useful because it discloses an airborne multi sensor system that includes radar, infrared, and television sensors. The Johnson reference senses both IR and radio waves and Brumbaugh shoes a combined RF and IR system.

In the present invention, radiometric area correlation is initiated as a radiometer is used to measure both emitted thermal signals and reflected energy to form a radiometer image that characterizes the terrain below the aircraft. For example, a commercially available radiometer would characterize terrain in accordance with the codes listed below in Table 2.

TABLE 2

| MATERIAL CODES FOR RAC | | |
|---|---|---|
| Code | Material | Expected Temperature Return |
| 1 | Metal | 137 |
| 2 | Mixed Metal | 186 |
| 3 | Water | 166 |
| 4 | Mixed Water (e.g., Swamp) | 212 |
| 5 | Pavement | 224 |
| 6 | Composition | 236 |
| 7 | Industrial | 228 |
| 8 | Urban - No Vegetation | 238 |
| 9 | Residential | 249 |
| 10 | Sand/Soil | 234 |
| 11 | Agriculture | 254 |
| 12 | Orchard | 272 |
| 13 | Range | 241 |
| 14 | Semi-Arid | 262 |
| 15 | Dense Vegetation | 279 |

Once a sensed map has been acquired, correlation is performed in order to position the sensed map on the stored reference map. The correlation algorithm for RAC is the Minimum Variance (MV) algorithm described above. It measures the ratio of the variance between features to the variance within features for each possible offset of the sensed map within the reference map.

The reference map for IAC is the same material encoded array as that used for RAC. The sensed map generation is similar to that in RAC with the exception that an expected intensity return table (see Table 3) is used to encode the sensed map. This table depends not only on material codes, but scan angle as well. The map is convoluted to form a 32×32 array for the sensed map. These map sizes are for the mid-altitude case and will vary accordingly for other altitudes. Note that there are columns −1, 0, 33 and 34 included in this table. These are required for the convolution with the beam spot filter to filter, the edges of the 32×32 map. Material code designations are outlined in Table 4.

TABLE 3

IAC EXPECTED INTENSITY RETURN
MATERIAL CODES

| Column | 1 | 2 | 3 | 4 | 10 | 11 | 13 | 15 |
|---|---|---|---|---|---|---|---|---|
| −1,34 | 6.04 | 6.12 | 8.76 | 17.49 | 12.85 | 13.11 | 11.92 | 20.24 |
| 0,33 | 6.18 | 6.35 | 10.21 | 18.87 | 13.00 | 13.43 | 11.93 | 20.43 |
| 1,32 | 6.32 | 6.71 | 11.94 | 20.20 | 13.13 | 13.75 | 11.94 | 20.61 |
| 2,31 | 6.48 | 7.30 | 13.89 | 21.48 | 13.25 | 14.08 | 11.96 | 20.79 |
| 3,30 | 6.69 | 8.28 | 15.98 | 22.72 | 13.36 | 14.42 | 11.97 | 20.94 |
| 4,29 | 7.04 | 9.80 | 18.10 | 23.88 | 13.45 | 14.76 | 11.98 | 21.12 |
| 5,28 | 7.80 | 12.02 | 20.26 | 24.98 | 13.54 | 15.11 | 12.00 | 21.27 |
| 6,27 | 9.24 | 14.69 | 22.34 | 26.00 | 13.62 | 15.47 | 12.01 | 21.44 |
| 7,26 | 11.57 | 17.62 | 24.35 | 26.95 | 13.69 | 15.82 | 12.02 | 21.53 |
| 8,25 | 14.74 | 20.68 | 26.28 | 27.83 | 13.76 | 16.18 | 12.02 | 21.67 |
| 9,24 | 18.38 | 23.72 | 28.08 | 28.61 | 13.83 | 16.53 | 12.03 | 21.76 |
| 10,23 | 22.22 | 26.68 | 29.75 | 29.30 | 13.89 | 16.86 | 12.04 | 21.85 |
| 11,22 | 26.05 | 29.51 | 31.25 | 29.90 | 13.95 | 17.16 | 12.05 | 21.94 |
| 12,21 | 29.80 | 32.16 | 32.57 | 30.40 | 14.00 | 17.42 | 12.05 | 22.01 |
| 13,20 | 33.49 | 34.64 | 33.70 | 30.81 | 14.05 | 17.65 | 12.06 | 22.06 |
| 14,19 | 36.89 | 36.86 | 33.95 | 31.13 | 14.08 | 17.82 | 12.06 | 22.1 |
| 15,18 | 39.50 | 38.60 | 35.24 | 31.32 | 14.10 | 17.94 | 12.06 | 22.1 |
| 16,17 | 40.88 | 39.42 | 35.57 | 31.43 | 14.11 | 18.00 | 12.06 | 22.14 |

TABLE 4

MATERIAL CODE DESIGNATION

| | |
|---|---|
| 1 | Water (1 knot wind) |
| 2 | Water (5 knot wind) |
| 3 | Water (10 knot wind) |
| 4 | Water (15 knot wind) |
| 10 | 5 cm Tall Grass (i.e., sand/soil in RAC) |
| 11 | 210 cm Corn (i.e., agriculture in RAC) |
| 13 | 80 cm Tall Grass (i.e., range in RAC) |

Returning to FIGS. 1 and 2, once the sensed map has been acquired by the sensor system (as shown in FIG. 1) the computer uses the correlation algorithm to locate the sensed map onto a reference map, which is stored in its memory, to locate the aircraft.

Figure 15:
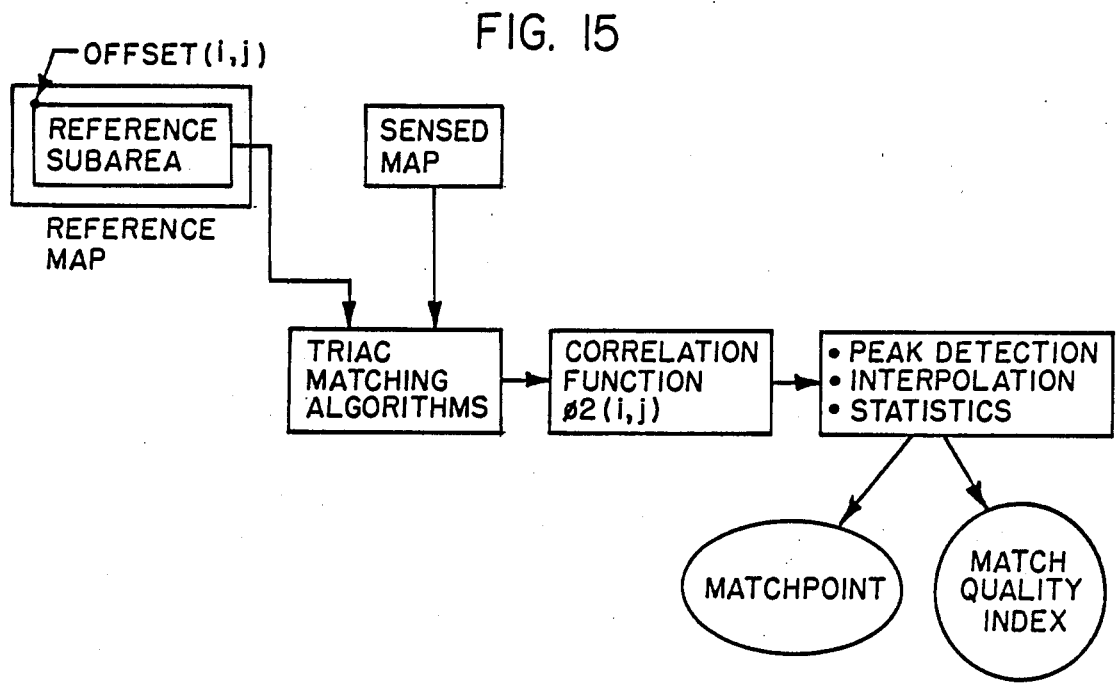
FIG. 15 is a flow diagram of the scene matching process used in the present invention.

The scene matching process is shown in FIG. 15. The basic matching process consists of four steps: (1) collection of an area sensed map (SM), (2) correlation of the SM with a prestored reference map (RM), (3) computation of a measure of fix quality based upon parameters extracted from the correlation function, and (4) updating the navigation system with position error and fix quality.

The sensed data is collected as a 32×32 element array scanned in the crosstrack direction. These data are converted to the desired range and resampled over a uniform grid using interpolation. The SM is compared to a stored RM at each possible offset to produce a correlation array. The numbers which comprise this array provide a relative measure of the "goodness of match" between the RM and SM data. Three RM sizes are used: 40×40, 44×44, and 56×56; the corresponding correlation arrays are 9×9, 13×13, and 25×25.

The correlation array is searched to determine the location of the highest peak, and an interpolation algorithm, utilizing data values in the vicinity of the peak, is used to estimate the peak location to subsample accuracy. The peak location is then converted into a position error signal. Additional statistics are derived from the correlation array as input to the match quality index (MQI) algorithm which provides an estimate of fix reliability to the guidance system.

The use of area sensed maps rather than line maps for fixtaking has the advantages of enhanced system reliability, utility, and survivability. Area sensing provides greater utility due to expanded scene availability. The matching of area patterns reduces the possibility of ambiguity and permits the use of more simple terrain features. High reliability and accuracy can be achieved using a single map rather than a multiple map set. As a result of this circumstance, scene availability is enhanced and fix taking can occur closer to the target. Finally, an area sensing system is less susceptible to jamming during fixtaking since the time required for fixtaking is less, more information is acquired per unit time, and the target approach direction is less predictable.

The present invention utilizes three different characteristics of the terrain. The first mode, TAC, uses a radar altimeter to measure slant range to the terrain. Through trigonometric relationships and knowledge of antenna beam pointing, the TAC range measurement is converted to terrain height. The terrain height is then subtracted from a reference altitude provided by the inertial system to provide terrain elevations relative to MSL. The final TAC sensed map is comprised of terrain elevation data quantized to 8 bits (256 levels). The second mode, RAC, is passive and utilizes a radiometer to sense the emitted and reflected thermal energy of the terrain. The sensed map data are proportional to the radiometric temperatures of the various materials which comprise the scene. The final mode, IAC, senses the intensity of the radar return from the scene. The sensed map data are proportional to the reflected energy in dB. Both RAC and IAC sensed maps are also quantized to 256 levels.

The correlation algorithm of Equation 1 is used to locate the sensed map on the reference map. The "correlation function, $\phi^2 MV$, is defined as:

$$\phi^2_{MV}(i,j) = \frac{K(i,j)}{1 + K(i,j)} \quad (1)$$

where $$K(i,j) = \sum_m \frac{N_m(i,j)\,[S_m(i,j) - S]^2}{\sum_m [N_m(i,j)\,\gamma_m(i,j)]} \quad (2)$$

and $$S = \frac{1}{N_s} \sum_{k,l} S(k,l) \quad (3)$$

$$S_m(i,j) = \frac{1}{N_m(i,j)} \sum_{k,l \in m} S(k,l) \quad (4)$$

$$\gamma_m(i,j) = \frac{1}{N_m(i,j)} \sum_{k,l:m} S^2(k,l) - [S_m(i,j)]^2 \quad (5)$$

The symbols used are defined below:

S(k,l) is the l th sample of the k th row of the SM.

$\bar{S}$ is the average value of the SM.

$\bar{S}_m$ (i,j) is the average value of the SM subset which corresponds to RM code m at offset (i,j).

$N_s$ is equal to the number of samples in the sensed map minus the number of no-counts.

$N_m$ (i,j) is the number of SM samples which correspond to RM code m at offset (i,j), reduced by the number of no-counts which also correspond to m.

$\gamma_m$ is the variance of the SM subset which corresponds to RM code m at offset (i,j).

$$\sum_{k\,l\,\epsilon\,m}$$

is the sum over all SM samples corresponding to RM code m at offset (i,j)

K(i,j) is the scene signal-to-noise ratio (SNR) at offset (i,j).

$\phi^2_{mv}$ (i,j) is the $j^{th}$ sample of the $i^{th}$ row of the correlation function.

The range of the pairs of indices (k,l) and (i,j) is the same as defined above. The range of the MV correlation function is:

$$0 \leq \phi^2_{mv} \leq 1$$

Despite the apparent complexity of the above definition, the MV algorithm has a quite simple interpretation, namely, $\phi^2_{mv}$ is the ratio of the between-feature SM variance to the within-feature SM variance.

The indices k and l range over the sensed map and reference comparison area:

$$0 \leq k, l \leq 31$$

An example of the location of a sensed map onto a reference map was mathematically demonstrated above using the equations. Note that the indices i and j range over all permissible offsets of the sensed map within the reference maps. If each matrix location on the reference point is assigned a distinct latitude and longitude, then the location of the aircraft can be determined when the sense map is positioned. In a sample example discussed in the above-cited Love reference, the radar made equidistance sweeps both uprange and downrange of the aircraft trajectory, as well as cross-sweeps from side to side. The result was the aircraft is always located an altitude directly above the center of the sensed map. This scheme is intended to serve as merely an example of a map matching navigation strategy, and other variations exist, as discussed below.

A general radar map-matching navigation strategy begins with the scan equations.

Figure 16:
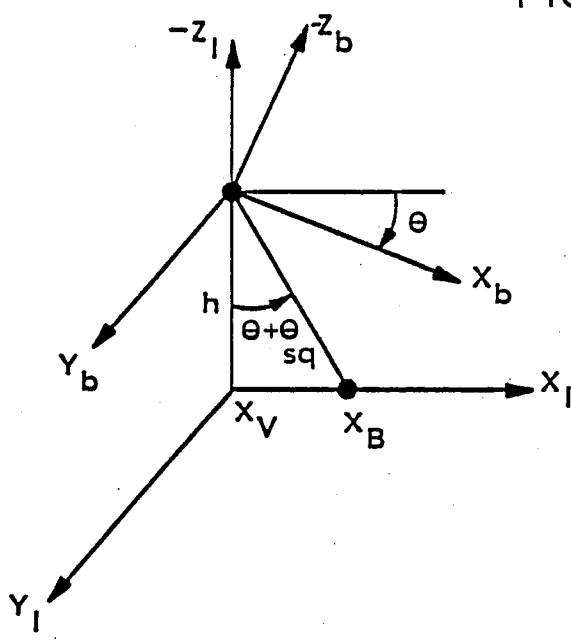
FIG. 16 is a diagram of the coordinate system used for the radar scanning equations for radar map matching navigation.

The scan equations consist of the equations used to point the beam, compute the dwell time, calculate the terrain heights, and interpolate the data to "straighten" out the scan pattern. All equations used were derived using the coordinate systems shown in FIG. 16.

In scanning, two things must be determined; the antenna pointing angle to the desired pixel and the length of time to dwell on that pixel. The time to dwell on each pixel, or dwell time, is computed once per row and is derived from the approximation:

$$\text{Time} = \text{Distance}/\text{Velocity} \tag{6}$$

Where:

Distance = pixel size/32 pixels

Velocity = velocity of beamspot

The velocity of the beamspot can be derived using FIG. 3. The beamspot position can be computed from:

$$X_B = X_V + h \text{ TAN } (\theta + \theta_{sq}) \tag{7}$$

Where:

h = altitude above terrain $\theta$ = pitch angle $\theta_{sq}$ = squint angle $X_V$ = vehicle position $X_R$ = beamspot position Beamspot velocity is then:

$$\dot{X}_B = \dot{X}_V + \dot{h} \text{ TAN } (\theta + \theta_{sq}) + h\,\dot{\theta}\, SEC^2 (\theta + \theta_{sq}) \tag{8}$$

which can be approximated (small angles) by:

$$\dot{X}_B = \dot{X}_V + \dot{h}(\theta + \theta_{sq}) + h\dot{\theta} \tag{9}$$

where:

$\dot{h}$ = altitude rate $\dot{\theta}$ = pitch rate $\dot{X}_V$ = vehicle ground velocity $\dot{X}_B$ = beamspot velocity For a skewed trajectory (component of velocity in the crosstrack direction), the effective distance traveled is decreased by the cosine of the skew angle ($\Psi$). This means that a skew angle not equal to zero will decrease the dwell time by the cosine of that angle. The basic dwell equation then becomes:

$$\text{Time} = \text{Distance}/\text{Velocity} \tag{10}$$

Where:

$$\text{Velocity} = \dot{X}_V + \dot{h}(\theta + \theta_{sq}) + h\dot{\Theta}$$

$$\text{Distance} = \text{COS } (\Psi) \text{ Pixel Size}/32 \text{ Pixels Per Row}$$

The assumption is made that the drift angle due to crosswind is zero and the sideslip angle ($\beta$) is zero. For small angles of drift and sideslip it can be shown that the effect of this approximation is acceptable. If large values of drift (extreme wind) and sideslip are expected, the ground track angle $\gamma_H$, can be substituted into the equation for $\Psi$, where $\gamma_H$ equals the inverse tangent of $\dot{Y}I/\dot{X}I$ (crosstrack velocity/downtrack velocity).

In order to obtain angles from navigation data (direction cosine matrix), the following approximations are used:

$$\theta \approx -B_{31} + 1/6\,(-B_{31})^3 \tag{11}$$

where $B_{31} = -\sin(\theta)$; and $$\Psi \approx B_{21}/(1 - \tfrac{1}{2}\theta^2) \text{ (small angle approx.)} \tag{12}$$

where:

$$B_{21} = \sin(\psi) \cos(\theta)$$

$$\cos(\theta) \approx 1 - 1/2\,\theta^2$$

$$\cos(\psi) \approx 1 - 1/2\,\psi^2$$

Using the above derivations and approximations, the dwell time equation becomes:

$$T_{DWELL} = \frac{(1 - 1/2\, \psi^2)\, \Delta/32}{X_V + h(\dot{\theta} + \theta_{sq}) + \dot{h}} \quad (13)$$

where
- $\Delta$ = pixel size (ft)
- $X_V$ = vehicle ground speed (ft/sec)
- $h$ = vehicle altitude above terrain (ft)
- $\dot{h}$ = altitude rate (ft/sec)
- $\theta_{sq}$ = squint angle (radians)
- $\dot{\theta}$ = pitch rate (radians/sec)

and $$\theta = -B_{31} + \frac{1}{6}(-B_{31})^3 \quad (14)$$

$$\psi = \frac{B_{21}}{(1 - 1/2\, \theta^2)}$$

where $B_{ij}$=element $ij$ of direction cosine matrix (body to inertial). $\dot{\theta}$ can be approximated (if not available from the aircraft's navigation system by:

$$\dot{\theta}_n = \frac{\theta_n - \theta_{n-1}}{t} \quad (15)$$

where:
- $\theta n = \theta$ at row n
- $\theta n-1 = \theta$ at row n−1
- t = time between row n−1 and n Errors in the dwell equation due to the approximations shown above are very minimal and can be ignored, since a dwell time error causes a known downtrack scan distortion, which is taken out through interpolation.

Figure 17:
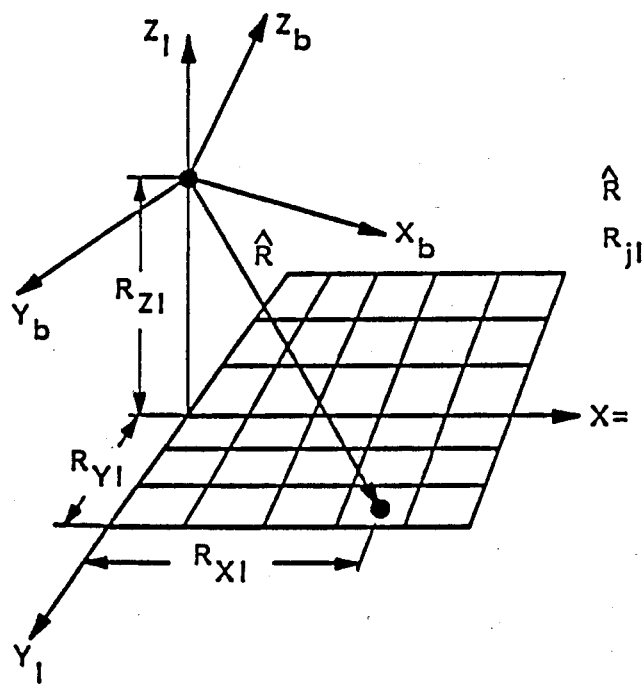
FIG. 17 is a diagram of the coordinate system of FIG. 16 and depicts the relationship between measured range and inertial range.

The antenna pointing command, executed once per pixel, is derived using the vector relationship between the slant range and the components of range in inertial coordinates. Using FIG. 17, the relationship between measured range and inertial range is:

$$\begin{bmatrix} R_{XI} \\ R_{YI} \\ R_{ZI} \end{bmatrix} = \begin{bmatrix} \text{BODY TO} \\ \text{INERTIAL} \\ \text{TRANSFORMATION} \end{bmatrix} \begin{bmatrix} \text{ANTENNA} \\ \text{TO BODY} \\ \text{TRANSFORMATION} \end{bmatrix} \begin{bmatrix} \sin \theta_{sq} \\ \cos \theta_{sq} \end{bmatrix} R \quad (16)$$

where

- $R_{jI}$ = component of slant range in $j$ direction ($j$ = X, Y, Z)
- $R$ = slant range
- $\theta_{sq}$ = squint angle These parameters are computed for each row of the sensed map from data acquired by the navigation system on board the vehicle.

$$\text{Dwell Time} = \frac{(1 - 1/2\psi^2)\, \Delta/32}{x_v + h(\dot{\theta} + \theta_{sq}) + \dot{h}\, \theta} \quad (17)$$

$$\text{Bias} = \psi(\dot{\theta} + \theta_{sq}) \quad (18)$$

$$\text{Scale} = 1 - 0.5083[\theta_{sq}^2 + \psi^2 - (\dot{\theta} + \theta_{sq})^2] \quad (19)$$

where:
- $\dot{\theta}$ = body rate*
- $x_v$ = ground velocity*
- $h$ = altitude above terrain

- $\dot{h}$ = altitude rate*
- $\theta_{sq}$ = squint angle
- $\Delta$ = pixel size
- $\Psi = B_{21}/(1\tfrac{1}{2}\theta^2)$
- $\theta = -B_{31} - B^2_{31}/6$
- $B_{ij}$ = ij-term of direction cosine matrix (body to inertial)*

*Indicates data acquired from vehicle navigation system.

During the scan process, the antenna angle is computed, the sensed range is converted to terrain height, and the distortion in the downtrack position of the beamspot is computed using accurate knowledge of vehicle attitude and position. Any error or "staleness" in the vehicle navigation data can cause errors in all of the above computations. Staleness in the navigation data is due to the fact that the scan equations, which use the navigation data, can be executed as often as once every 0.3 ms, while the navigation data are updated every 5.8 ms. Prior to navigation update, the vehicle position data can be in error as much as 85 ft, and attitude error as much as 0.8 degree (for a velocity of 15 kft/s and body rate of 120°/s). This can cause up to approximately 60 ft of error in the computation of terrain height and 170 ft of error in beamspot position for the mid-altitude case. From these errors, it is obvious that the vehicle position and altitude must be propagated between navigation updates. In order to account for vehicle motion between navigation updates, the vehicle position is updated using these equations:

$$h\text{REF}_{(NEW)} = h\text{REF}_{(OLD)} + \dot{h}\Delta T \quad (20)$$

$$X \text{ vehicle (NEW)} = X \text{ vehicle (OLD)} + \dot{X}_V \Delta T \quad (21)$$

where
- hREF = vehicle reference altitude (above sea level)
- $\dot{h}$ = vehicle altitude rate
- X vehicle = XI position of vehicle
- $X_V$ = vehicle ground velocity
- $\Delta T$ = time since last MaRV update The following requirements apply to the preparation of reference maps for all three modes. Requirements specific to each mode are described above.

1. A single map is required for each update.
2. Maps are prepared for a specified heading. Most scene types, however, can be used for an arbitrary heading.
3. The center coordinates of each map must be accurately determined.
4. Reference maps are prepared in raster format with the same sample spacing in the downtrack and cross-track direction.
5. Three altitude ranges are specified. For a given altitude range, the map size and sample spacing are fixed. These parameters are independent of data type or scene characteristics.

Figure 18:
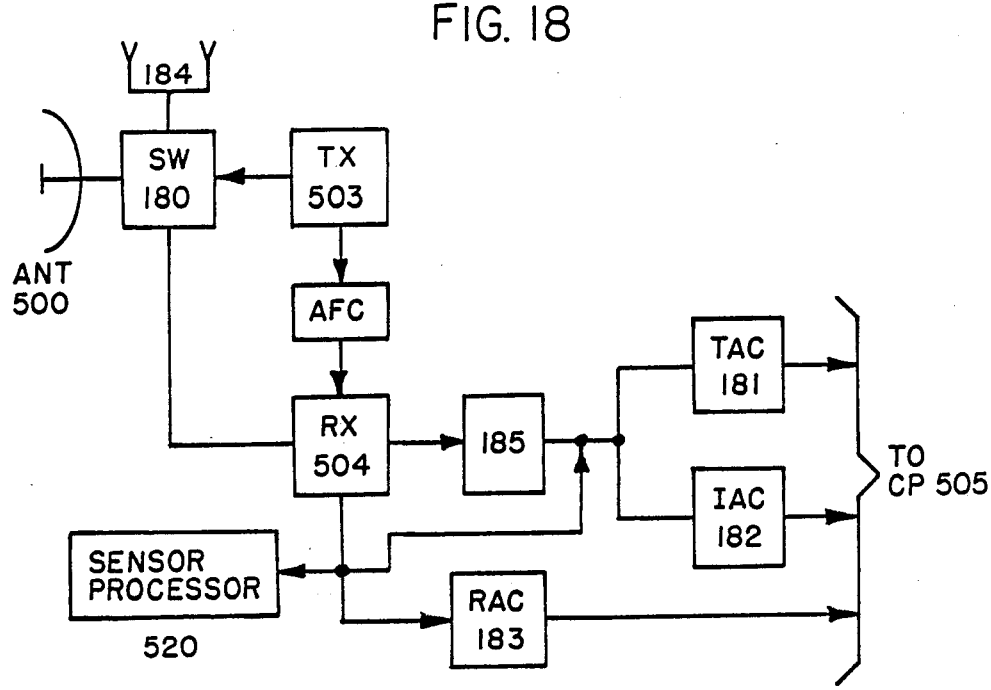
FIG. 18 is a simplified block diagram of the TRIAC system used in the present invention with three modes of operation.

FIG. 18 is a simplified block diagram of the TRIAC system which uses all three modes of operation (TAC, IAC, and RAC) to obtain a terrain signature in the form of three separate sensed maps for map-matching navigation. The system of FIG. 18 has a number of elements in common with the sensor systems of FIGS. 5 and 6. These include the radar antenna 500, the transmitter 503, the receiver 504, and the sensor processor 520.

The radar antenna transmits radar scan signals and collects radar terrain echo return signals for both the TAC and IAC systems in the manner described above. Terrain echo return signals are forwarded to the receiver 504, converted to digital 185, and sent to separate TAC and IAC procecssors 181 and 182 for map-matching.

The switch 180 in FIG. 18 allows the commercially-available radiometer 184 to collect a radiometric temperature image of the terrain. This data is amplified by the receiver 504 and forwarded to the RAC processor 183 for map matching correlation as described above.

Both the TAC and IAC systems can use the same radar antenna because they both can extract terrain information from the terrain echo return signals. The only difference between them is that the TAC system identifies a terrain signature based upon terrain height, while the IAC system identifies a terrain signature by correlating the intensity of the radar return signal with the material code designations listed in Table 4.

Note that the system of FIG. 18 is intended to serve only as an example of the present invention. The present invention can use three entirely separate sensor systems (like that of FIG. 5) for TAC, IAC and RAC modes of operation.

While the invention has been described in its presently preferred embodiment it is understood that the words which have been used are words of description rather than words of limitation and that changes within the preview of the appended claims may be made without departing from the scope and spirit of the invention in its broader aspects.

What is claimed is:

1. A map-matching aircraft navigation system which provides an identification of an aircraft's position in latitude and longitude, said map-matching navigation system comprising:

a first radar system which is housed in said aircraft and which transmits radio frequency signals in a point beam which sequentially strikes terrain in a first rectangular matrix in a pattern of points in rows and columns on terrain beneath said aircraft, said radar system receiving terrain echo returns from said pattern of rows and columns to output a first sensed map of said terrain with varying reflectivity coefficients in each of the points in the rows and columns;

a radiometer which is housed in said aircraft and which detects a radiometric temperature image of the terrain in a second rectangular matrix in a pattern of points to output a second sensed map of said terrain with varying measures of thermal emissions and reflected energy; and a means for comparing said first and second sensed maps respectively with first and second stored reference maps, said first stored reference map containing a third rectangular matrix of rows and columns indicative of expected terrain echo return signals from the terrain over which said aircraft is flying, said comparing means finding a maximum correlation between said first sensed map and said first stored reference map to position and first sensed map on said first stored reference map, said comparing means thereby locating said aircraft on said first stored reference map, said comparing means also identifying each point in said third rectangular matrix with a known corresponding latitude and longitude in order to extract and output said aircraft's position in latitude and longitude from its location on said first stored reference map, said comparing means containing a fourth rectangular matrix of rows and columns indicative of expected radiometric temperature image signals from the terrain over which the aircraft is flying, said comparing means finding a maximum correlation between said second sensed map and said second stored reference map to position said second sensed map on said second stored reference map to position said aircraft on said second stored reference map, said comparing means also identifying each point on fourth rectangular matrix with a known corresponding latitude and longitude in order to extract and output said aircraft's position in latitude and longitude from its location on said second stored reference map after said second sensed map has been positioned on said second stored reference map.

2. A map-matching navigation system, as defined in claim 1, including a second radar system which is housed in said aircraft and which transmits radio frequency signals in a point beam which sequentially strikes terrain in a fifth rectangular matrix in a pattern of points and rows and columns on terrain beneath said aircraft, said radar system receiving terrain echo returns from said patterns of rows and columns to output a third sensed map of said terrain with the terrain in said third sensed map characterized by terrain height.

3. A map-matching navigation system, as defined in claim 2, wherein said comparing means comprises:

a storage device which outputs said first, second and third stored reference maps along with their known corresponding latitude and longitude for each of the rows and columns in the second, fourth and six rectangular matrices; and a correlator data processor which receives said first sensed map from said first radar system, said second sensed map from said radiometer, and said third sensed map from said second radar system so that they are respectively correlated with the first, second and third stored reference maps from said storage device to derive said aircraft's position, said correlator data processor finding a maximum correlation between said stored reference maps and said sensed maps using a minimum variance correlation function in which the correlation of each point of said sensed maps with each point of said stored reference maps is calculated to yield an offset, said offset indicating where said sensed maps are positioned on said stored referenced maps, said minimum variance correlation function comprising:

$$\phi^2_{MV}(i,j) = \frac{K(i,j)}{1 + K(i,j)}$$

where KC(i,j) is the scene signal-to-noise ratio given by:

$$K(i,j) = \sum_m \frac{N_m(i,j)[S_m(i,j) - S]^2}{\sum_m [N_m(i,j)\gamma_m(i,j)]}$$

-continued and $$S = \frac{1}{N_S} \sum_{k,l} S(k,l)$$

$$S_m(i,j) = \frac{1}{N_m(i,j)} \sum_{k,l \in m} S(k,l)$$

$$\gamma_m(i,j) = \frac{1}{N_m(i,j)} \sum_{k,l \in m} S^2(k,l) - [S_m(i,j)]^2$$

$S(k,l)$ is an $l^{th}$ sample of a $k^{th}$ row of the sensed maps;
$\bar{S}$ is an average value of the sensed map;
$\bar{S}_m(i,j)$ is an average value of the SM subset which corresponds to reference maps (RM) code m at offset (i,j);
$N_s$ is equal to the number of samples in the sensed map minus a number of no-counts;
$N_m(i,j)$ is a number of sensed maps samples which correspond to reference maps code m at offset (i,j), reduced by a number of no counts which also correspond to m;
$\gamma_m$ is a variance of the sensed maps subset which corresponds to reference maps code m at offset (i,j);

$$\sum_{k,l \in m}$$

is a sum over all sensed maps samples corresponding to reference maps code m at k, offset (i,j);
K(i,j) is the scene signal-to-noise ratio (SNR) at offset (i,j); and $\phi^2_{mv}(i,j)$ is a $j^{th}$ sample of an $i^{th}$ row of the correlation function.

4. A map-matching aircraft navigation process which provides an identification of an update of an aircraft's position in latitude land longitude, said map-matching navigation process comprising the steps of:
identifying said aircraft's last known position by acquiring it from said aircraft's primary navigation system;
acquiring a first sensed map of terrain beneath said aircraft by transmitting radio frequency signals in a point beam which sequentially strikes terrain beneath said aircraft in a pattern of points which forms a first rectangular matrix of rows and columns on terrain beneath said aircraft, said sensed map being composed of a first matrix of terrain echo return signals with varying intensities indicative of varying reflectivity coefficients of said terrain in said pattern of points in said first rectangular matrix of rows and columns;
detecting a second sensed map of the terrain beneath said aircraft by transmitting radio frequency signals in a point beam which sequentially strikes terrain beneath said aircraft in a pattern of points which forms a second rectangular matrix of rows and columns on terrain beneath said aircraft, said sensed map being composed of a second matrix of terrain echo return signals indicative of varying terrain height of said terrain in said pattern of points in said second rectangular matrix of rows and columns;
sensing a third sensed map of the terrain beneath said aircraft using a radiometer which is housed in said aircraft and which detects a radiometric temperature image of the terrain in a third rectangular matrix in a pattern of points to output said third sensed map of said terrain with varying measures of thermal emissions and reflected energy; and
comparing said first, second and third sensed maps respectively with first, second and third stored reference maps which respectively contains third, fourth and fifth rectangular matrices of rows and columns indicative of expected detected terrain signals from the terrain over which said aircraft is flying, said comparing step including finding a maximum correlation between said first, second and third sensed maps and said first, second and third stored reference maps to position said first second and third sensed maps respectively on said first, second and third reference maps, said comparing step thereby locating said aircraft on said first second and third reference map;
identifying each point in said third, fourth and fifth rectangular matrices with a known corresponding latitude and longitude in order to extract and output said aircraft's position in latitude and longitude from its location on said first, second, and third reference maps; and
outputting said corresponding latitude and longtitude of said aircraft's position on said stored reference maps to provide said update of said aircraft's position.

5. A map-matching navigation process, as defined in claim 4, wherein said acquiring step includes transmitting said radio frequency signals in an equidistance pattern on either side of the aircraft as well as ahead and behind the aircraft so that said aircraft is located at said first sensed map's exact center, said acquiring step thereby enabling said aircraft's position to be determined once said first sensed map is positioned on said first stored reference map in said comparing step.

6. A map matching navigation process, as defined in claim 5, wherein said comparing step includes finding a maximum correlation between said first, second and third stored reference maps and said first, second and third sensed maps using a minimum variance correlation function in which the correlation of each point of said first, second and third sensed maps respectively with each point of said first, second and third reference maps is calculated to yield an offset, said offset indicating where said first, second and third sensed maps are positioned on said first, second and third stored referenced maps, said minimum variance correlation function comprising:

$$\phi^2_{MV}(i,j) = \frac{K(i,j)}{1 + K(i,j)}$$

where KC(i,j) is the scene signal-to-noise ratio given by:

$$K(i,j) = \sum_m \frac{N_m(i,j)[S_m(i,j) - \bar{S}]^2}{\sum_m [N_m(i,j) \gamma_m(i,j)]}$$

$$S = \frac{1}{N_S} \sum_{k,l} S(k,l)$$

$$S_m(i,j) = \frac{1}{N_m(i,j)} \sum_{k,l \in m} S(k,l)$$

$$\gamma_m(i,j) = \frac{1}{N_m(i,j)} \sum_{k,l \in m} S^2(k,l) - [S_m(i,j)]^2$$

S(k,l) is an $l^{th}$ sample of a $k^{th}$ row of the selected sensed maps;

$\bar{S}$ is an average value of the sensed map;

$\bar{S}_m(i,j)$ is an average value of the SM subset which corresponds to the reference map (RM) code m at offset (i,j);

$N_S$ is equal to the number of samples in the sensed map minus a number of no-counts;

$N_m(i,j)$ is a number of sensed maps samples which correspond to reference maps code m at offset (i,j), reduced by a number of no-counts which also correspond to m;

$\gamma_m$ is a variance of the sensed maps subset which corresponds to reference maps code m at offset (i,j);

$\phi^2_{mv}(i,j)$ is a $j^{th}$ sample of an $i^{th}$ row of the correlation function;

$$\sum_{kl \in m}$$

is a sum over all sensed map samples corresponding to reference maps at code M at offset (i,j) and K(i,j) is the scene signal-to-noise ratio (SNR at offset (i,j).

* * * * *